United States Patent [19]

Rothfjell

[11] Patent Number: 4,856,077
[45] Date of Patent: Aug. 8, 1989

[54] METHOD OF SIGNATURE VERIFICATION AND DEVICE FOR CARRYING OUT THE METHOD

[76] Inventor: Eric Rothfjell, Lotsvägen 4, S-952 00 Kalix, Sweden

[21] Appl. No.: 138,031
[22] PCT Filed: Apr. 27, 1987
[86] PCT No.: PCT/SE87/00217
  § 371 Date: Jan. 14, 1988
  § 102(e) Date: Jan. 14, 1988
[87] PCT Pub. No.: WO87/06744
  PCT Pub. Date: Nov. 5, 1987

[51] Int. Cl.[4] .......................... G06K 9/00; G06K 9/22
[52] U.S. Cl. ......................................... 382/3; 382/13; 340/708; 235/472
[58] Field of Search .......................... 382/3, 13, 59, 9; 340/707, 708; 235/472

[56] References Cited

U.S. PATENT DOCUMENTS

| | | | |
|---|---|---|---|
| 3,111,646 | 11/1963 | Harmon | 382/9 |
| 4,141,073 | 2/1979 | Tan | 382/59 |
| 4,241,409 | 12/1980 | Nolf | 382/13 |
| 4,369,431 | 1/1983 | Howbrook | 382/3 |
| 4,475,240 | 10/1984 | Brogardh et al. | 382/3 |
| 4,581,482 | 4/1986 | Rothfjell | 382/3 |
| 4,703,511 | 10/1987 | Conoval | 382/13 |

Primary Examiner—Leo H. Boudreau
Assistant Examiner—Donald J. Daley
Attorney, Agent, or Firm—Silverman, Cass, Singer & Winburn, Ltd.

[57] ABSTRACT

A method and a device for signature verification, where an electric pulse train individual for every person in question is caused to be generated in that said person is allowed to move a pen comprising at its nib a light-emitting member and a light-sensitive member over a background, whereby an electric pulse train is caused to be emitted from the light-sensitive member in response to patterns on said background, and where said pulse train generated at a certain occasion is caused by means of a computer, processor or corresponding device to be compared with pulse trains generated earlier.

The invention is characterized in that said pen at its nib comprises a writing pen or a ballpoint pen capable to bring about a line when the pen is moved on a support capable to write on, such as a paper document, and said pulse train is generated when the person at the writing of his/her signature with the pen nib crosses lines written earlier during the writing with the pen, and that the signature being in writing constitutes said background.

11 Claims, 1 Drawing Sheet

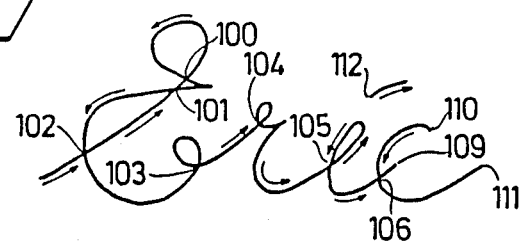
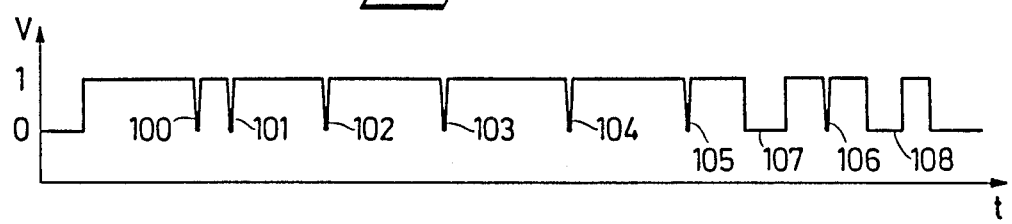
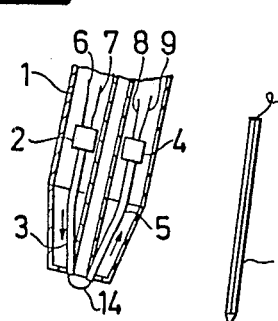
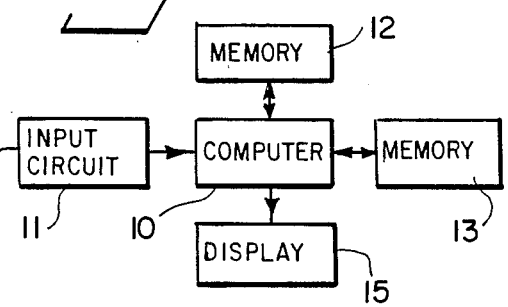
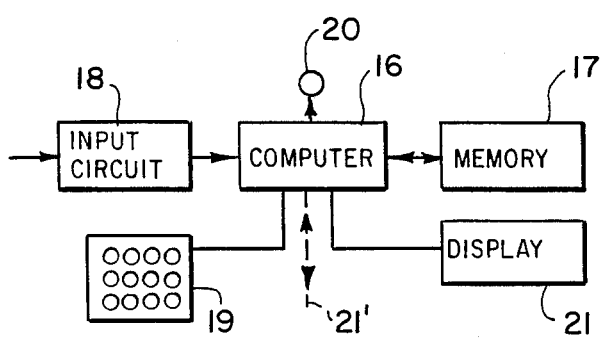

METHOD OF SIGNATURE VERIFICATION AND DEVICE FOR CARRYING OUT THE METHOD

This invention relates to a method of verifying a signature and to a device therefor.

It is increasingly problematic to correctly identify persons. This applies to a vast number of situations. One example is at examination of passports, another example is at the carrying out of bank errands, and a third example is at authority checks, e.g. at computer terminals.

With few exceptions, the signature of a person is a very characteristic depiction of a person, and therefore it is used widely for documents of value, orders of payment, deeds of agreement etc.

In Swedish Patent Application No. 8303799-4, which corresponds to issued U.S. Pat. No. 4,581,482, a method for signature verification and a device therefor are described.

The invention according to said Swedish patent specification is characterized in that an electric pulse train individual for every person concerned is caused to be produced by allowing said person to move a so-called read pen over a patterned background comprising dark and light portions, and that such a pulse train produced at a definite occasion is caused by means of a computer to be compared with pulse trains produced earlier by the same person and stored in said computer or corresponding device. According to a preferred embodiment, the patterned background consists of a bar code comprising dark bars in parallel with each other separated by lighter bars or areas. In said patent a great number of application fields are set forth, which apply also to the present invention.

A method according to said Swedish patent provides a high level of security. The method, however, has the disadvantage that it requires a patterned background to be available, and that this background must be standardized.

A method according to said Swedish patent, moreover, does not allow a person actually to write down his/her signature, because the intention is that the person moves a read pen over a standardized background, which must not be messed about with a number of signatures. Besides, a person cannot actually write down his/her signature on a document, such as a cheque, a note for a monetary transaction etc. and thereby by writing identify him-/her-self.

The present invention, however, renders possible such an identification and at the same time eliminates the disadvantage that a standardized background must be available.

The present invention, thus, relates to a method of signature verification, where an electric pulse train individual for every person in question is caused to be produced by allowing said person moving a pen, which comprises at its nib a light-emitting member and a light-sensitive member, over a background, whereby an electric pulse train is caused to be emitted from the light-sensitive member in response to the pattern on said background, and said pulse train produced at a definite occasion is caused by means of a computer, processor or corresponding device to be compared with pulse trains produced earlier.

The invention is characterized in that said pen comprises at its nib a writing pen or a ballpoint pen capable to bring about a line upon its movement on a support capable to write on, such as a paper document, and that said pulse train is produced when the person upon writing the signature with the pen nib crosses lines written earlier at the writing down with the pen, and that the signature being written down constitutes said background.

The invention also comprises a device for carrying out the aforesaid method, which device more precisely is of the kind and has substantially the characterizing features as defined in claim 6.

The invention is described in greater detail in the following, partially with reference to the embodiments shown in the accompanying drawing, in which FIG. 1 shows a signature, FIG. 2 shows a pulse train produced at the writing of the signature in FIG. 1, FIG. 3 shows a nib of a pen on an enlarged scale, FIG. 4 shows a device according to a first embodiment of the invention, and FIG. 5 shows a device according to a second embodiment of the invention.

FIGS. 3 and 4 are schematically shown block diagrams of a device according to the invention. The device is capable to produce an electric pulse train individual for every person in question, which pulse train corresponds to a written signature. The term signature is to be understood to refer to all sorts of signs, Figures, signatures etc. The device comprises a pen 1, which comprises a light-emitting member and a light-sensitive member. The pen 1 can in these respects be designed as a read pen of a suitable known type. It is preferred, however, to dimension the pen correspondimg to a normal writing pen. Preferably a light-emitting member, such as a light emitting diode 2, is provided in the pen, and from the light emitting diode 2 a light guiding fibre 3 is arranged down to the pen nib, so that the fibre 3 upon positioning the pen nib on a support lights up the support near the pen nib. It is preferred in a corresponding way to provide a light-sensitive member, such as a photo-transistor 4, in the pen and to arrange a light guiding fibre 5 extending from a place near the pen nib to the photo-transistor 4, which fibre 5 is arranged to receive light emitted from said firstmentioned fibre 3 and reflected against the support. The light emitting member 2 and the light sensitive member 4 are connected via conductors 6, 7; 8, 9 to a circuit for current supply to the members and for detecting the output signal of the light sensitive member 4. When the pen is moved over a background comprising light and dark portions, thus, a signal in the form of an electric pulse train is produced at the output of the light sensitive member 4.

The device is designed so that said pulse train is emitted to a computer 10, processor or corresponding device while the person in question moves the pen against the support. The computer 10 is arranged so as to compare a pulse train produced at one occasion with pulse trains fed earlier into the computer 10.

According to one embodiment shown in FIG. 4, the pen is connected to an external computer 10 which, for example, can be a computer associated with a bank or corresponding institution. According to this embodiment, an input circuit 11 is provided for feeding the pulse train emitted by the photo-transistor 4 into the computer. In a first phase a number of signatures are written by the same person. These signatures are stored in a memory 12 associated with the computer. The computer 10, after having received such a series of pulse trains, is arranged, in ways set forth below by way of example, to compare these pulse trains and thereby to select portions of said pulse trains which to a predetermined degree are alike. The term portions, of course, are to be understood here and in the claims as only fragments of, or sections of or as the entire pulse trains. Subsequent to such a comparison, the computer 10 is arranged to store the identical portions in a memory 13. The memory 12 and the memory 13, of course, physically can be one and the same.

In a second phase, after said storage of identical portions, the computer 10 is arranged upon the writing of a signature by a person to compare the pulse train produced thereby with corresponding stored portions and thereby evaluate whether the pulse train produced last comprises portions corresponding to the portions stored and to a predetermined degree are alike the same. When likeness has been established, the person having written the last signature is considered identical with the person who had written a number of signatures in said first phase.

According to the present invention, said pulse train is produced in a special way. Said pen 1 comprises for this purpose also a writing pen 14 or a ballpoint pen or corresponding one, which is capable to bring about a line upon moving the pen on a support capable to write on, i.e. like a normal pen. The writing pen can be of lead or be a writing pen for ink. Preferably, however, it should be a ballpoint pen. A support capable to write on is understood to be paper, plastic etc., on which the writing pen or ballpoint pen leaves behind a line. The term support especially refers to documents of value, cheques, attendance lists etc., on which a person is asked to verify something by writing his/her signature on the support.

When the pen is moved over the support, thus, it leaves behind a line. When a person writes his/her signature, lines will cross each other. This is in any case in almost all cases correct. At each such crossing a pulse appears at the output 8,9 of the photo-transistor 4. Hereby arises a pulse train individual for each person. The present invention, thus, is based on the understanding, that said pulse train shall be produced in that upon writing of a signature the signature being written constitutes the aforesaid background, i.e. source for the pulses.

In FIG. 1 the signature ERIC is shown, which can be a part of a full signature. The direction, in which the pen is moved at the writing is indicated by arrows. In FIG. 2 a voltage-time diagram is shown where the voltage corresponds to the output voltage from the photo-transistor 4.

The numeral "0" designates the voltage level arising when the pen is held away from the support or when the pen lights up a dark portion on the support, i.e. when no light or only little light is transferred via the light guide 5 to the photo-transistor 4. The numeral "1" designates the voltage level arising when light is reflected from the orifice of the light guide 3 via the support to the orifice of the light guide 5.

The numerals 100–106 designate in FIG. 1 the crossings carried out when the pen is moved in the direction of the arrows, and in FIG. 2 designate corresponding pulses. As shown, thus, seven pulses appear, with different time ratios between them.

Additionally, two longer pulses appear on level "0", viz. pulse 107 and 108. The pulse 107 originates from that the person has lifted the pen after completed writing of "E" in ERIC until commencing writing of "C" in ERIC, i.e. from point 109 to 110. The pulse 108 originates from that the person has lifted the pen between the points 111 and 112.

As stated above, the entire first pulse train, i.e. the pulse train stored in the memory of the computer 10 and, respectively, (only) portions thereof can be compared with the second pulse train and, respectively, only portions thereof, i.e. the pulse train generated by the person when signature verification is to take place.

It is probable, namely, that a very high security level can be achieved even when only a portion of the pulse trains is compared, and at the same time the acceptance level can be kept high when only a portion of the pulse trains is compared. This is a consequence of that a person writes his/her signature differently, which a.o. depends on the prevailing mental conditions of the person.

In most cases, however, a certain number of sections are very alike each other, substantially irrespective of the mental condition and the effect of external factors.

For these reasons it is not of interest what the signature as such looks like, but only to which pulse train it gives rise with a given bar code.

At an analysis of such a pulse train it is the number of parameters, as well as the combination of different parameters, which provide the accuracy with which the signature must be written in relation to pulse trains stored in the computer, in order that acceptance shall be obtained, i.e. that verification shall be deemed having taken place.

It may be pointed out that a signature of the kind on hand often is written in different moments, and the pen is lifted between the different moments. At the writing of such a signature a plurality of partial pulse trains will appear.

For a comparison between different pulse trains, thus, the number of pulse trains, the absolute length of each pulse train or the length in relation to the total length of all pulse trains, the number of pulses in each pulse train and the absolute length of each pulse or its position relative to the pulse train, in which the pulse is included, can be utilized.

It depends on the application field, the desired level of acceptance etc., which of the methods mentioned or which combination thereof will be used. The expert, therefore, is free within the scope of the invention to select the parameters or parameter combinations suitable for the object intended.

According to one embodiment, however, the position of one or several pulses in a pulse train in relation to the length of the pulse train or a portion thereof constitute characteristic values at a comparison between pulse trains. These values are easy to read and have good reproducibility. The same applies to another embodiment, according to which the duration for one or several pulses in relation to the duration of the entire pulse train or a portion thereof constitute characteristic values. It is thus obvious, that an expert can utilize a plurality of criteria for classifying and identifying such pulse trains. The invention in its widest scope is not restricted to any principle, according to which the identification takes place.

As stated above, in a first phase a great number of pulse trains is fed into the memory 12 of the computer. The computer 10 is programmed in a suitable known manner to compare such first pulse trains according to different criteria with each other and thereby to select certain characteristic portions or sections of pulse trains and thereafter to store such selected portions or sections in the second memory 13. Said memory 13 can also include the identity card number, account number, to which parts of a data register a certain person has permission of access, or other information.

At signature verification, thus, the person in question again writes his/her signature with the pen. The pulse train generated thereby is stored in the memory 12 of, the computer. The computer 10 is capable by suitable programming to compare at least a portion of a pulse train stored in its second memory 13 with at least a portion of the pulse train fed into the memory 12. When it is proved by the comparison, that the pulse trains or portions thereof are to a predetermined degree alike each other, the computer is arranged to state that verification can be deemed having taken place, that the signature written last is written by the same person having written the signature, which gave rise to pulse trains in said first phase. For this purpose, a display 15 or corresponding device can be connected to the computer 10. The computer, however, can be connected to additional computers, which are informed that verification has taken place, in that the computer 10 emits a signal to such computers.

The signal can contain, for example, identity card number, account number connected to the person, together with a code stating that the person has been identified.

As the computer 10, the memories 12, 13 associated therewith, and the programming of a computer for achieving the aforesaid object are well-known prior art, they are not described here in detail.

It is apparent, that the technique described above for generating an individual pulse train gives rise to a pulse train characteristic for the signature of a certain person, or in any case to a pulse train, which is equally characteristic as the visible signature.

Due to the present invention, thus, no special standardized background is required. The only requirement to be met concerning the support is, that the support as such does not give rise to pulses when a read pin without writing pen and with a sensitivity corresponding to the optical sensitivity of the present pen 1 is moved over the support.

This in its turn implies, that the present invention can be utilized for signature verification when persons sign papers and documents of different kind.

At the embodiment described above the pen 1 is connected to external data power.

According to a second embodiment, however, the said computer, processor or corresponding device is located in the pen 1 together with necessary memories. In FIG. 5 such an embodiment is shown schematically in the form of a block diagram. In FIG. 5 the numeral 16 designates a computer, processor or corresponding device, the numeral 17 designates a memory, the numeral 18 an input circuit, and the numeral 19 a set of keys. According to this embodiment, the computer 16 and memory 17, as well as the input circuit 18 have the functions described above for the computer 10 and memories 12, 13 and the input circuit 11. The key set 19 is so connected to the computer 16 that the computer via the key set can be instructed on the type of operation to be carried out. For this purpose one or several keys are intended to be used at the feed-in of pulse trains in said first phase. Certain keys are intended to be used for instructing the computer 16 to compare the pulse trains thus fed in. Other keys are intended to be used when a person shall write his/her signature in said second phase.

At this embodiment where the pen 1 contains all necessary electronic equipment, the pen, of course, is intended to be a personal belonging. In order to prevent its undue use, for example that some person writes a made-up signature for another predetermined person, the computer of the pen can be arranged to be opened for storage in said first phase via a personal code, which is to be keyed-in by means of the key set 19 by the person who owns the pen. This embodiment is primarily intended to be used for authority checks etc., for example within a company or administration agency where only certain staff members are provided with such pens, and where a guard or like person controls that the person writes his/her signature in a list, and that the pen accepts the signature written. Provided that a generated pulse train agrees to a predetermined degree with said stored portions of the pulse train stored in said first phase, the computer 10;16 is arranged to emit a signal to an indication device. A signal, of course, also can be emitted in cases where no acceptance is obtained.

When the pen has the design according to FIG. 5, preferbly an indication device in the form of a light emitting diode 20 is provided on the pen. The pen can also be provided with a display 21 for indicating what has been fed-in via the key set 19 and/or for showing acceptance or non-acceptance.

According to a third embodiment, the pen 1 is connected in the first phase to an external computer 10, to which the pen is caused to emit a great number of pulse trains, which are generated by a person by means of the pen. The computer 10 is thereafter caused to compare these trains and thereby select portions of the trains, which to a predetermined degree are alike each other, by using one or several of the aforementioned methods. Thereafter the external computer 10 is arranged to store the like portions in the memory 17 in the pen 1. In this case the computer 16 in the pen can be designed more simply, because the considerable amount of data to be processed at the comparison of many pulse trains are processed in an external computer.

After selected portions have been stored in the memory 17, the connection 21' shown by dashed lines in FIG. 5 between the computer 16 of the pen and the external computer 10 is disconnected.

When the person in said second phase writes his/her signature with the pen, the internal computer 16 in the pen is caused to compare the pulse train then generated with corresponding portions stored by the external computer 10 in the memory 17 of the pen.

This embodiment can provide a very safe identification of that the person in question really is the person having the signature in question, provided that at the delivery or purchase of pens an accurate control is carried out. Banks, for example, can hand out such pens, in which case the bank computers are utilized as external computers. Pulse trains from the first phase as well as writing specimens of the signature can be held in safe-keeping by the bank.

A number of embodiments have been described above.

Irrespective of the embodiment, however, the invention offers the great advantage, that a signature can be accepted or not in connection with the writing of the signature on a support, such as a paper document or the like.

It is obvious, that the design of the pen can be varied, and also the possible peripheral equipment desired can be varied, without abandoning the invention idea, viz.

generating an individual pulse train corresponding to a person's signature by utilizing the signature during its writing.

The present invention, therefore, must not be regarded restricted to the embodiments set forth above, but can be varied within the scope of the attached claims.

I claim:

1. A method of signature verification, at which an electric pulse train individual for every person in question is generated in that said person is allowed to move a pen, which includes at its nib a light-emitting member and a light-sensitive member, over a background, whereby an electric pulse train is caused to be emitted from the light-sensitive member in response to patterns on said background, and said pulse train generated at a certain occasion is caused by means of a computer, processor or corresponding device to be compared with pulse trains generated earlier, comprising said pen (1) including at its nib a writing pen (14) or a ballpoint pen arranged to leave behind a line that forms said background when the pen is moved against a support capable to write on, such as a paper document, and that said pulse train is generated as a binary pulse train, derived solely from crossover points in said signature when the person at the writing of his/her signature with the pen nib (14) crosses over lines written earlier at the writing with the pen of said signature, such that the signature being written constitutes said background.

2. A method as defined in claim 1, characterized in that a number of signatures in the form of pulse trains generated by the same person by means of the pen (1) in a first phase are stored in said computer (10;16), which thereby is caused to compare the same and thereby select portions of said pulse trains,, which to a predetermined degree are alike each other, and thereby store said like portions in a memory (13;17) for in a second phase when the person writes his/her signature comparing the pulse train then generated with corresponding said stored portions.

3. A method as defined in claim 1, characterized in that said computer (16), processor or corresponding device is positioned in said pen (1) together with necessary memories (17), whereby the pen (1) is caused to carry out signature verification without assistance by any external computer.

4. A method as defined in claim 1, characterized in that the pen (1) is connected to an external computer (10), processor or corresponding device, in which in a first phase a great number of pulse trains are stored, which are generated by the person with the pen, whereafter said external computer (10) is caused to compare these trains and thereby select portions of said pulse trains, which to a predetermined degree are alike each other, and that the external computer (10) is arranged to store the like portions in a memory. (17) provided in the pen (1), and in a second phase when the person writes his/her signature an internal computer, processor or corresponding device provided in the pen (1) is caused to compare the pulse train then generated with corresponding portions stored in the memory (17).

5. A method as defined in claim 1, characterized in that said computer (10;16), processor or corresponding device, when a generated pulse train to a predetermined degree agrees with said stored portions, is caused to emit a signal to an indication device (15;20,21), such as a light emitting diode.

6. A device for signature verification capable to generate an electric pulse train individual for each person in question, including a pen, which at its nib includes a light-emitting member and a light-sensitive member, whereby said pen is arranged to emit said pulse train to a computer, processor or corresponding device when the pen by the person in question is moved over a background comprising light and dark portions, where said computer is arranged to compare a pulse train generated at one occasion with pulse trains generated earlier, comprising said pen (1) at its nib including a writing pen (14) or a ballpoint pen arranged to bring about a line that forms said background when the pen is moved on a support capable to write on, such as a paper document, and that the pen (1) is arranged to emit an electric pulse when the person at the writing of the signature with the pen nib (14) crosses over lines written earlier at the writing with the pen (1) of said signature forming a binary pulse train derived solely from crossover points in said signature, such that the signature being written constitutes said background.

7. A device as defined in claim 6, characterized in that said computer (10;16) is arranged in a first phase to store a number of signatures in the form of pulse trains, which are generated by the same person by means of the pen (1), and to compare the same and thereby to select portions of said pulse trains which to a predetermined degree are alike each other, and thereby to store the like portions, which computer (10; 16) is arranged in a second phase when the person writes the signature to compare the pulse train then generated with corresponding stored portions.

8. A device as defined in claim 6, characterized in that said computer (16), processor or corresponding device is located in said pen (1) together with necessary memories (17), whereby the pen (1) is capable to carry out signature verification without assistance by any external computer.

9. A device as defined in claim 6, characterized in that the pen (1) can be connected to an external computer (10), processor or corresponding device, to which the pen (1) in a first phase is arranged to emit a number of pulse trains, which are generated by the same person by means of the pen (1), that the external computer (10) is arranged to compare these pulse trains and thereby to select portions of said pulse trains which to a predetermined degree are alike each other, and the external computer (10) thereafter is arranged to store the like portions in a memory (17) located in the pen (1), and in a second phase when the person writes his/her signature an internal computer (16), processor or corresponding device located in the pen is arranged to compare the pulse train then generated with corresponding portions stored in said memory (17).

10. A device as defined in claim 6, characterized in that said computer (10), processor or corresponding device is arranged, when a generated pulse train to a predetermined degree agrees with said stored portions, to emit a signal to an indication device (15;20,21), such as a light emitting diode.

11. A method of signature verification comprising:
A. generating at least one electric binary pulse train individual to a signature of a given person and derived solely from crossover points in said signature, formed by said person moving a pen over a desired surface, said pen having at its nib a light-emitting member, a light-sensitive member, and a writing pen for producing an image on said surface, said pulse train being generated by said person writing said person's signature on said surface to form a background on said surface so that when said person crosses over lines written earlier in said signature by said writing pen, said light-sensitive member emits said pulse train in response to the pattern of said background;

B. storing said at least one electric binary pulse train in a computer or the like;
C. generating a second electric binary pulse train by said person in the manner of step A; and
D. comparing said second electric binary pulse train to said at least one stored pulse train for said verification.

* * * * *